United States Patent
Yashima et al.

(10) Patent No.: US 6,748,990 B2
(45) Date of Patent: Jun. 15, 2004

(54) METHOD AND APPARATUS FOR WATERPROOFING A WIRE HARNESS

(75) Inventors: Ryoukichi Yashima, Yokkaichi (JP); Hisashi Kurachi, Yokkaichi (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 176 days.

(21) Appl. No.: 10/040,381

(22) Filed: Jan. 9, 2002

(65) Prior Publication Data

US 2002/0125024 A1 Sep. 12, 2002

(30) Foreign Application Priority Data

Jan. 9, 2001 (JP) .......................... 2001-001717

(51) Int. Cl.[7] .................. H01B 7/28; H01B 13/00; H02G 1/14
(52) U.S. Cl. .................. 156/358; 156/580; 100/4; 100/30; 100/43; 100/214; 140/150; 269/903
(58) Field of Search .............. 156/47, 48, 53, 156/350, 358, 580; 269/55, 58, 237, 287, 903; 100/4, 16, 30, 43, 214; 140/150

(56) References Cited

U.S. PATENT DOCUMENTS 5,035,766 A * 7/1991 More et al. ............. 156/581
5,536,904 A * 7/1996 Kojima et al. ........... 174/23 R
5,635,678 A * 6/1997 Yasukuni ................. 174/152 G
5,641,942 A * 6/1997 Iriyama et al. ........... 174/72 A
5,846,467 A * 12/1998 Saito et al. ............... 264/263
6,302,980 B1 * 10/2001 Kortenbach et al. ....... 156/48
6,463,849 B2 * 10/2002 Mizutani .................. 100/35

FOREIGN PATENT DOCUMENTS

JP   2000-48649    * 2/2000
JP   2000-114746   * 4/2000

* cited by examiner

*Primary Examiner*—Jeff H. Aftergut
*Assistant Examiner*—John T. Haran
(74) *Attorney, Agent, or Firm*—Greenblum & Bernstein, P.L.C.

(57) ABSTRACT

A plurality of electric wires of a wire harness have a filler applied to predetermined waterproofing portions thereof. A sheet is wound on a peripheral surface of a bundle of electric wires to which the filler has been applied, and the sheet-wound waterproofing portion is repeatedly pressed from opposite sides. By such pressing, a relative displacement of the electric wires and the filler can be accelerated and the filler can be spread and filled securely in the waterproofing portion.

14 Claims, 7 Drawing Sheets

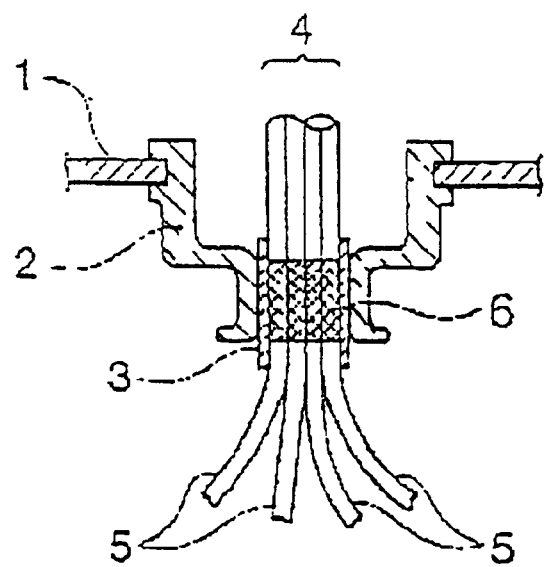
FIG. 1
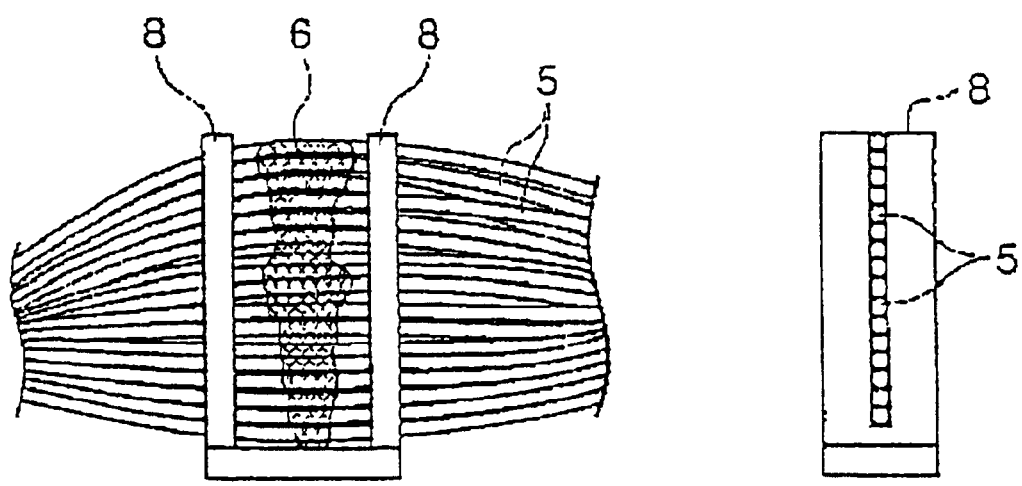
FIG. 2A
PRIOR ART
FIG. 2B
PRIOR ART

METHOD AND APPARATUS FOR WATERPROOFING A WIRE HARNESS

BACKGROUND OF THE INVENTION

1. Field of the Invention

The present invention relates to a method and apparatus for waterproofing a wire harness, such as one disposed in the boundary between an engine compartment and vehicle interior, where prevention of water penetration is necessary.

2. Description of the Related Art

When placing a wire harness in the boundary between the engine compartment of a vehicle and the interior, prevention of water penetration is necessary. Conventionally, as shown in FIG. 1, a grommet 2 fixed to a main wire portion of a wire harness 4 is mounted in a through-hole of a partitioning plate 1 disposed between the engine compartment of the vehicle and the interior to prevent the penetration of water into the gap therebetween. In such an arrangement, a sheet 3 may be wound on a grommet-engaging portion of the wire harness 4. Water penetrates into the gap between the wire harness 4 and the sheet 3, as well as gaps between electric wires 5 constituting the wire harness 4, if the gaps are empty. In order to prevent water penetration, filler 6, such as silicon, is filled between the wire harness 4 and the sheet 3, and the gaps between electric wires 5.

A waterproofing method which includes filling the filler 6 into the gaps between the electric wires 5 is disclosed in Japanese Patent Application Laid-Open No. 2000-114746. In this method, as shown in FIGS. 2A and 2B, a plurality of electric wires 5 constituting the wire harness 4 are flattened, the electric wires 5 are arranged in close contact with each other and fixed between two electric wire-supporting tools 8, and the filler 6 is applied to each of the arranged electric wires 5. As shown in FIG. 3, the filler-applied flattened electric wires 5 are next arranged in a sectionally circular bundle, and finally the bundle is covered with the sheet 3.

In the above-described method, the filler is merely applied to the surface of each of the electric wires 5 arranged in close contact with each other. Thus, the filler does not penetrate into the gaps between the electric wires 5 arranged in close contact with each other. Therefore, when the electric wires 5 are thereafter arranged in a sectionally circular bundle, there is the potential for fillerless gaps 7 to be generated.

Thus, if the filler has a high viscosity, there is a high possibility that a gap 7 devoid of filler will be generated. Further, improvement of the filler-filled condition after the sheet 3 is wound around the bundle of the electric wires 5 is limited. Thus, it is impossible to provide a wire harness having reliable waterproof performance.

SUMMARY OF THE INVENTION

The present invention has been made in view of the above-described problems. Accordingly, it is an object of the present invention to provide a method and an apparatus for waterproofing a wire harness, which is capable of accelerating spreading and penetration of a filler after a sheet is wound around a bundle of electric wires to achieve an enhanced waterproofing performance.

To achieve the foregoing object, according to the present invention, a method for waterproofing a wire harness is provided that includes providing a wire harness having a plurality of electric wires, applying a filler to the electric wires at a predetermined waterproofing portion of the wire harness, winding a sheet around a peripheral surface of the bundled electric wires to which the filler has been applied, and pressing the sheet covered waterproofing portion of the wire harness to produce spreading and penetration of the filler into gaps between the sheet and the electric wires and gaps between the electric wires themselves.

According to the method of the present invention, the bundle of electric wires is pressed inward from the outer side of the sheet after the sheet is wound around the portion to which the filler is applied. Therefore, it is possible to displace the electric wires and the filler relative to each other and accelerate the penetration of the filler filled in the waterproofing portion and enclosed within the sheet into the gaps between the sheet and the electric wires and the gaps between the electric wires themselves.

The present invention also includes a wire harness having a waterproofing portion formed according to such a method.

In a further aspect of the present invention, the sheet covered waterproofing portion of the wire harness is initially pressed in a first radial direction, and thereafter pressed in a second radial direction. The first radial direction may be substantially perpendicular to the second radial direction. The pressing may further include repeatedly patting the sheet covered waterproofing portion of the wire harness.

In a further aspect of the present invention, the waterproofing portion is pressed while the wire harness is continuously fed along a feed path.

Further, in the method according to the present invention, the waterproofing portion of the wire harness is radially pressed by a clamping mechanism, and a pressing position of the waterproofing portion is altered by a rotation mechanism that rotates the clamping mechanism about an axis of the waterproofing portion. The clamping mechanism may be rotated by an amount so that a pressing direction after rotation is substantially perpendicular to a pressing direction prior to rotation. Further still, the waterproofing portion may be pressed by the clamping mechanism, and the clamping mechanism may be rotated by the rotation mechanism, while the wire harness is continuously fed along a feed path.

In another aspect of the present invention, there is provided an apparatus for waterproofing a wire harness that includes a clamping mechanism configured to clamp a waterproofing portion of a bundle of electric wires of a wire harness so that the bundle is pressed in a radial direction thereof, the waterproofing portion having a sheet wound around the bundle of electric wires and a filler for sealing gaps between the electric wires and the sheet. The apparatus includes a rotation mechanism configured to rotate the clamping mechanism about an axis of the waterproofing portion, and a controller that controls operation of the clamping and rotation mechanisms. The controller controls the clamping and rotation mechanisms so that at predetermined time intervals, the rotation mechanism alters a pressing position of the waterproofing portion by rotating the clamping mechanism relative to the waterproofing portion.

In this aspect of the present invention, because the clamping mechanism clamps a sealed portion of the bundle of electric wires, the sealed portion deforms radially, and the rotation mechanism circumferentially alters the pressing position of the waterproofing portion to be pressed by the clamping mechanism. Therefore, the sealed portion of the bundle of electric wires is massaged by the clamping mechanism, which accelerates the spreading and penetration of the filler filled into the waterproofing portion into the gaps between the sheet and the electric wires and the gaps between the electric wires themselves.

In a further aspect of the present invention, the clamping mechanism is substantially U-shaped and includes opposing arms configured to receive the waterproofing portion therebetween. The clamping mechanism repeatedly pats the waterproofing portion.

It is preferable that the rotation mechanism includes an introduction groove containing gear connected with the clamping mechanism for rotation therewith and having an introduction groove configured to receive the waterproofing portion therein, and a driving mechanism including an output gear configured to engage and drive the introduction groove containing gear to rotate the clamping mechanism about the axis of the waterproofing portion. In this case, the pair of power transmission gears (introduction groove containing gear and output gear) of the driving mechanism can rotate the clamping mechanism easily in the circumferential direction of the waterproofing portion. Further, the introduction groove containing gear may be driven by an amount so that a pressing direction after rotation of the clamping mechanism is substantially perpendicular to a pressing direction prior to rotation of the clamping mechanism.

In still another aspect of the present invention, the rotation mechanism and the clamping mechanism are mounted on a conveyor line for feeding the wire harness in such a way that a hand unit carrying the rotation mechanism and the clamping mechanism is moved by a movement mechanism that allows the hand unit to move in the wire harness-feeding direction so that the rotation mechanism and the clamping mechanism follow the movement of the waterproofing portion of the wire harness along the conveyor line. The movement mechanism moves the clamping mechanism and rotation mechanism in the downstream direction at the same speed as that of the wire harness.

In this case, when the waterproofing portion of the wire harness is waterproofed by the rotation mechanism and the clamping mechanism, the waterproofing portion can be pressed, with the wire harness being moved on the conveyor line. Thus, it is possible to waterproof the wire harness automatically on the conveyor line.

In a further aspect of the present invention, a detector is provided for detecting a position of the wire harness along the feed path. The detector may detect a leading edge of an assembly board on which the wire harness is fed along the feed path. The movement mechanism moves the clamping mechanism downstream in response to a signal from the detector.

In another aspect of the present invention, an apparatus for waterproofing a wire harness is provided which includes a clamping mechanism configured to clamp a waterproofing portion of a bundle of electric wires of a wire harness so that the bundle is pressed in a first radial direction thereof, the waterproofing portion including a sheet wound around the bundle of electric wires and a filler for sealing gaps between the electric wires and the sheet. The apparatus also includes a rotation mechanism configured to rotate the clamping mechanism about an axis of the waterproofing portion so that the clamping mechanism presses the bundle in a second radial direction thereof.

BRIEF DESCRIPTION OF THE DRAWINGS

The above and other objects, features and advantages of the present invention will be made apparent from the following description of the preferred embodiments, given as non-limiting examples, with reference to the accompanying drawings in which:

FIG. 1 is a sectional view showing a wire harness disposed in the boundary between an engine compartment of a vehicle and the vehicle interior;

FIGS. 2A and 2B are views showing a conventional method for filling a filler between electric wires;

DETAILED DESCRIPTION OF THE PREFERRED EMBODIMENTS

A preferred embodiment of the present invention will be described below with reference to the drawings.

Figure 4:
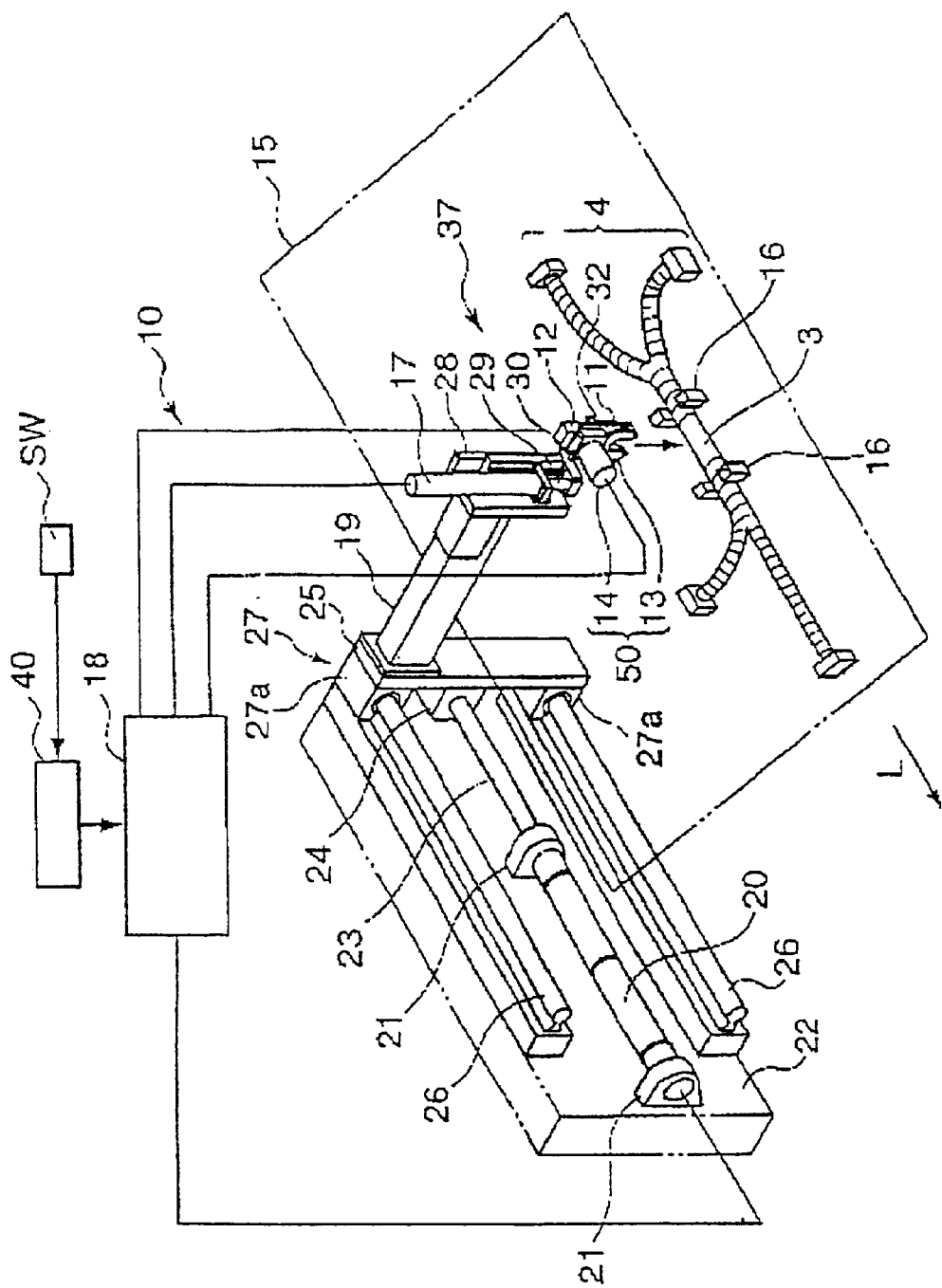
FIG. 4 is a perspective view showing a schematic construction of an apparatus for waterproofing a wire harness according to an embodiment of the present invention.

FIG. 4 is a perspective view showing a schematic construction of an apparatus for waterproofing a wire harness according to an embodiment of the present invention.

With reference to FIG. 4, a waterproofing apparatus 10 is mounted at a waterproofing station along a conveyor line L for manufacturing a wire harness 4.

The conveyor line L feeds an assembling plate 15 for assembling the wire harness 4 along an endless feed path. The assembling plate 15 moves horizontally from station to station along the feed path at a low speed. An operator side of the assembling plate 15 (on an outer side of the feed path), is inclined to be lower than the opposite side.

Holding tools or jigs (not shown) are provided on each assembling plate 15, on which electric wires and various external parts are mounted according to predetermined assembly stages for the wire harness 4.

A pair of wire harness-fixing tools 16 are provided on the assembling plate 15. The fixing tools 16 hold a waterproofing portion of a main electric wire portion of the wire harness 4 in position therebetween. The position of the waterproofing portion corresponds to the position where an unshown grommet will be located on the wire harness. The fixing tools 16 are located so as to hold electric wires 5 of the main wire portion so that the waterproofing portion is positioned between the fixing tools 16.

The waterproofing apparatus 10 has a slide cylinder base 22 provided on the inner side of the feed path, a pair of slide guides 26 mounted on the slide cylinder base 22, a slider 27 mounted on each slide guide 26, a slide cylinder 20, for example a pneumatic or hydraulic cylinder, for driving the slider 27, an air chuck-supporting arm 19 mounted on slider 27, and a hand unit 37 provided at a free end of the air chuck-supporting arm 19.

The slide cylinder base 22 may be in the form of a frame-shaped structure supported by legs. The longitudinal direction of the slide cylinder base 22 is coincident with the feeding direction of the assembling plate 15.

The slide guides 26 are disposed parallel with each other along the longitudinal direction of the slide cylinder base 22. The slide guides 26 serve as guide members for reciprocating the slider 27 along the feeding path.

The slider 27 has a pair of connection members 27a mounted on the respective slide guides 26, an arm-supporting plate 25 fixed to each of the connection members 27a, and a rod connector 24 fixed to the arm-supporting plate 25. The arm-supporting plate 25 carries the air chuck-supporting arm 19. An end of a rod 23 of the slide cylinder 20 is fixed to the rod connector 24. The slide cylinder 20 allows the slider 27 to reciprocate in a set stroke range on the slide guides 26.

The slide cylinder 20 may be disposed between both slide guides 26 and fixed to the slide cylinder base 22 by a pair of fixing elements 21. The slider 27 connected to the end of rod 23 is reciprocated by reciprocation of rod 23 in parallel with the slide guides 26.

The air chuck-supporting arm 19 carried by the slider 27 may be formed in any suitable manner, such as in the form of a rectangular pipe. The rear end of the air chuck-supporting arm 19 is connected to the arm-supporting plate 25 in any suitable manner, such as by welding. The air chuck-supporting arm 19 supports the hand unit 37 by provision of a fixing tool 28 at the front end thereof.

The hand unit 37 includes a vertically extending elevating cylinder 17 supported by the fixing tool 28, an elevating member 30 which is moved upwardly and downwardly by a rod 29 of the elevating cylinder 17, such as a pneumatic or hydraulic cylinder, a holder 32 supported by the elevating member 30, an air chuck 12 supported by the holder 32 and serving as a clamping member, and a rotation mechanism 50 for rotation of the air chuck 12. The elevating cylinder 17 moves the air chuck 12 upwardly and downwardly between a clamping position in which hands 11 of the air chuck 12 clamps the waterproofing portion of the wire harness 4 under pressure and a retracted position in which the hands 11 retract from the wire harness 4.

Figure 5:
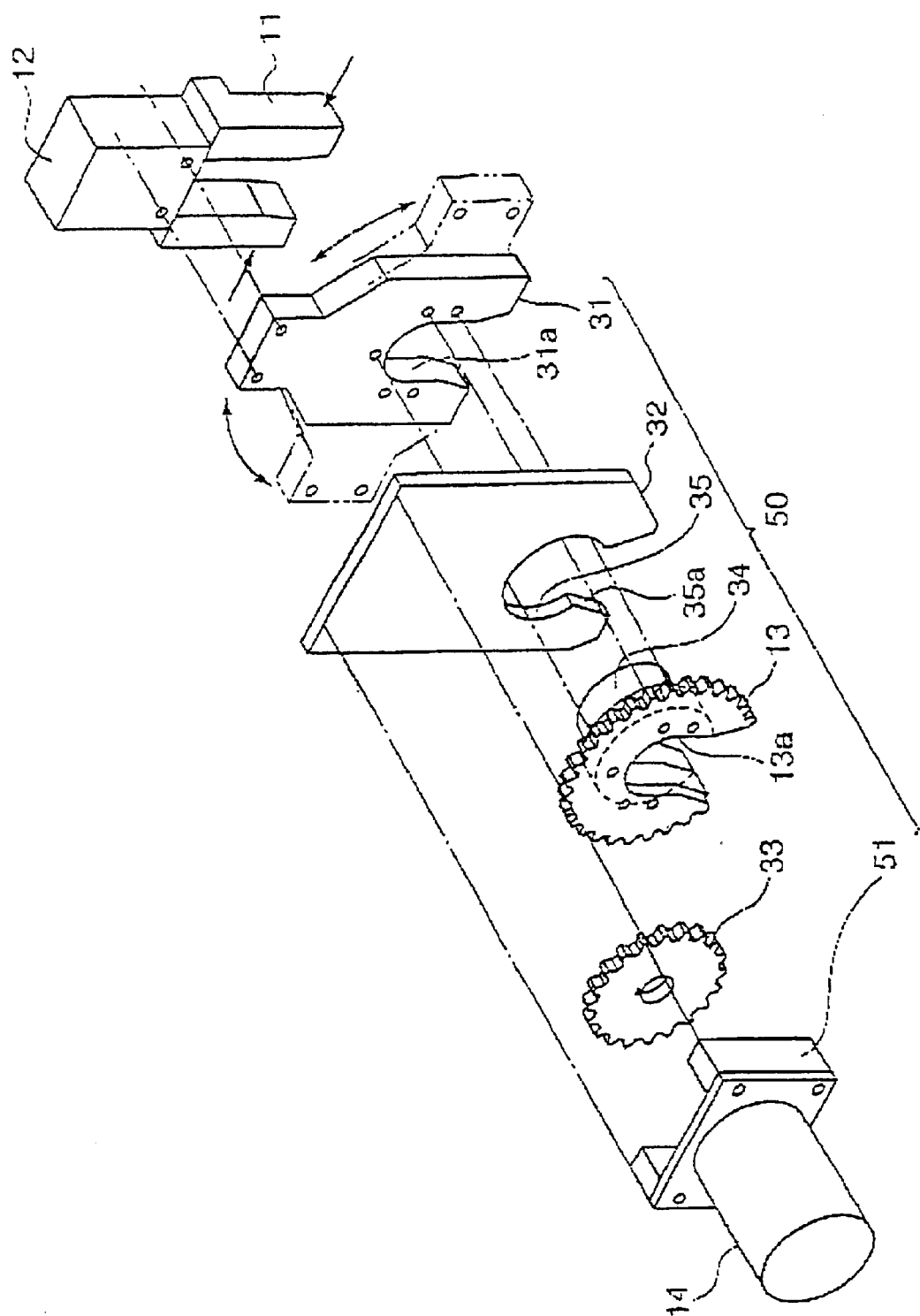
FIG. 5 is an exploded perspective view showing main portions of a hand unit.
Figure 6:
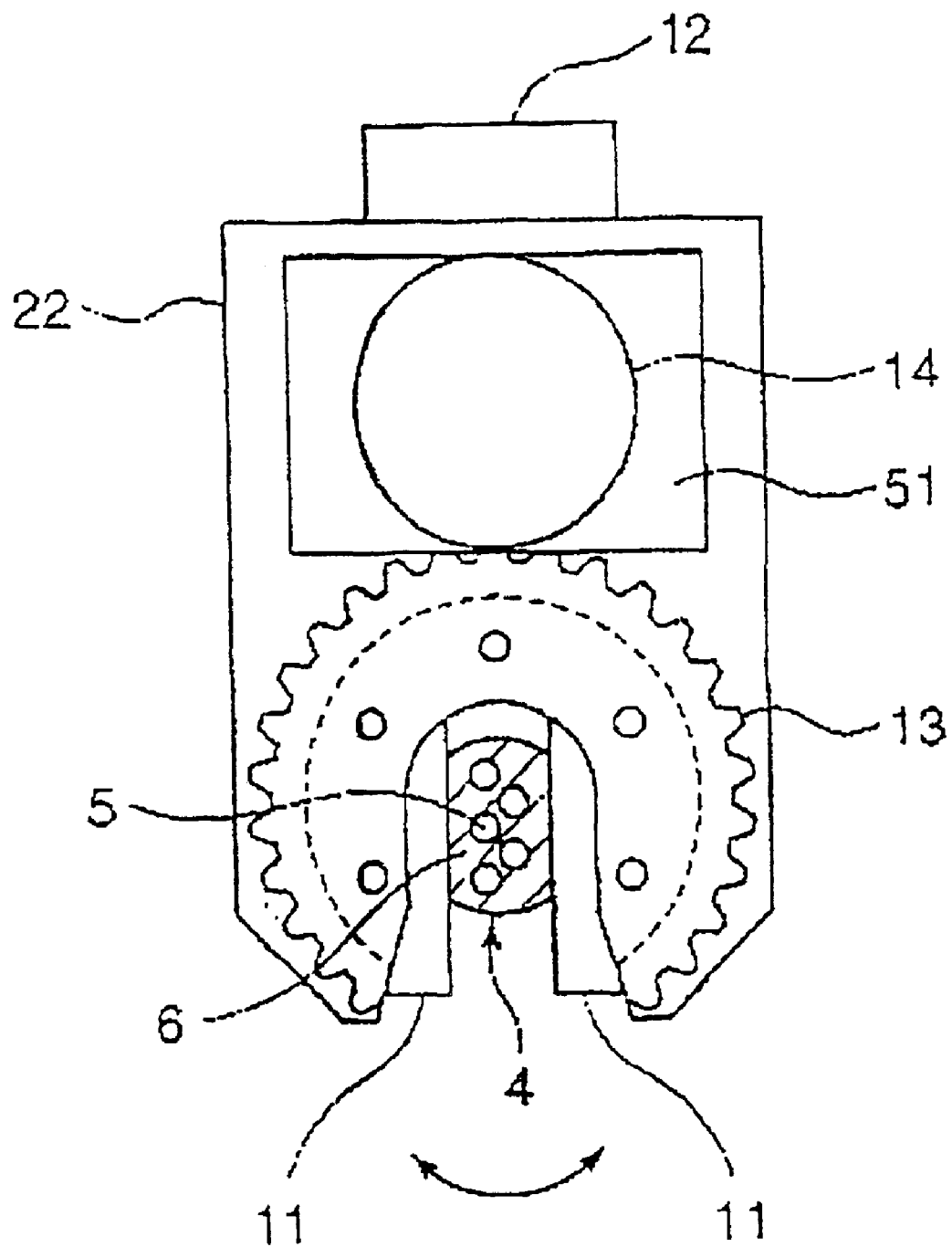
FIG. 6 is a front view of the hand unit.
Figure 7:
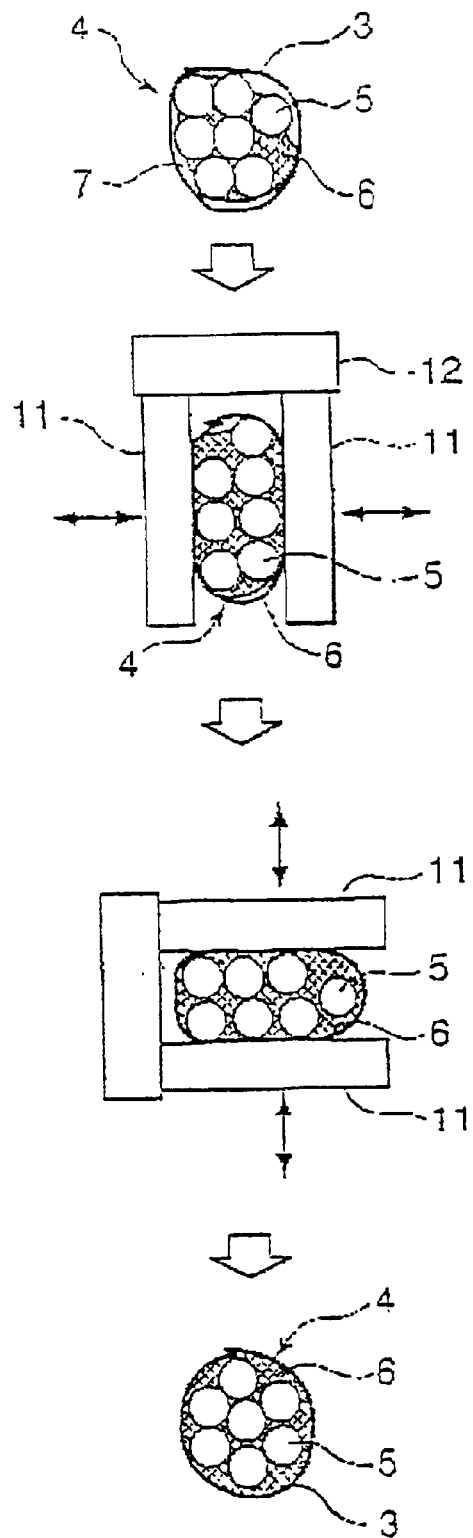
FIG. 7 is schematic view showing stages of an operation performed by the hand unit.

FIG. 5 is an exploded perspective view showing main portions of the hand unit 37. FIG. 6 is a front view of the hand unit 37. FIG. 7 is a schematic view showing stages of the operation performed by the hand unit 37.

With reference to FIGS. 5 through 7, the air chuck 12 has a pair of hands 11 which form a substantially U-shaped clamping member. The hands 11 are configured to be opened and closed (note the direction of arrows in FIG. 5) by supplying the air chuck 12 with compressed air to clamp the waterproofing portion of the wire harness 4 under pressure. It is noted that other clamping mechanisms, such a hydraulic or servo controlled, may instead be provided. For example, a servo motor could be provided in place of air chuck 12.

The rotation mechanism 50 for rotating the air chuck 12 has a supporting member 31 which supports the body of the air chuck 12, an introduction groove containing gear 13 fixed to the supporting member 31, an output gear 33 engaging the introduction groove containing gear 13, and a rotary actuator 14, such as a hydraulic, pneumatic or servo motor, serving as a driving source for rotating the output gear 33.

The supporting member 31 is fixed to the body of the air chuck 12 in any suitable manner, such as with screws. On a lower portion of the supporting member 31, there is formed a groove 31a for receipt of a waterproofing portion of the wire harness 4 therein between hands 11.

The introduction groove containing gear 13 has a hub 34 facing the supporting member 31 and a wire harness introduction groove 13a recessed diametrically beyond the center of the introduction groove containing gear 13. The introduction groove containing gear 13 is fixed to the air chuck 12 through the supporting member 31 in any suitable manner, such as with bolts. The wire harness introduction groove 13a is aligned with the open groove 31a of the supporting member 31.

In order to combine these members with each other, an introduction hole 35 and an open groove 35a contiguous with the introduction hole 35 are provided in holder 32. The air chuck 12 is rotatably installed on the holder 32 through the introduction groove containing gear 13 and the supporting member 31 by rotatably fitting the hub 34 of the introduction groove containing gear 13 into the introduction hole 35 for supporting the introduction groove containing gear 13 thereby.

The output gear 33 engages the introduction groove containing gear 13 and transmits the driving force from the rotary actuator 14 to the introduction groove containing gear 13. In this embodiment, the rotational amount of the introduction groove containing gear 13 is set to 90°. However, the rotational amount may be any suitable value. Thus, the output gear 33 directly connects an output shaft of the rotary actuator 14 and the introduction groove-formed gear 13.

The rotary actuator 14 is installed on an upper portion of the holder 32 with a fixing mechanism 51 serving as a gear case for driving the output gear 33. The air chuck 12 is rotated in both directions (as shown in phantom lines in FIG. 5) by the introduction groove containing gear 13 being engaged with the output gear 33 and the supporting member 31 being fixed to the introduction groove containing gear 13.

With reference to FIG. 4, a suitable fluid supply, such as a compressed air supply source 18, is connected to the slide cylinder 20, the elevating cylinder 17, the air chuck 12, and the rotary actuator 14. The compressed air supply source 18 may be provided with an electromagnetic valve, or other suitable actuatable valve. By controlling the operation of the electromagnetic valve, compressed air can be supplied to the slide cylinder 20, the elevating cylinder 17, the air chuck 12, and the rotary actuator 14 at a timing which will be described below. It is noted that instead of a pneumatic supply source, other types of controls, such as hydraulic control, could also be provided.

The electromagnetic valve of the compressed air supply source 18 is connected to a control unit 40 which controls the operation of the electromagnetic valve and the rotary actuator 14. The control unit 40 may include a microprocessor and other electrical/electronic parts. The control unit 40 operates each part as follows. In the embodiment, the waterproofing apparatus 10 is mounted on a wire harness-manufacturing line to perform a waterproofing operation for each assembling plate 15 fed along the feed path. The waterproofing apparatus 10 has a detection switch SW for detecting the position of the assembling plate 15. The assembling plate 15 may be provided with a dog switch for detection of the position of the assembling plate 15 in combination with the switch SW. For example, switch SW may be activated by engagement with the leading edge of an assembling plate 15. Other types of detectors, such as photo detectors, may also be provided.

The operation of the embodiment will be described below.

Figure 8:
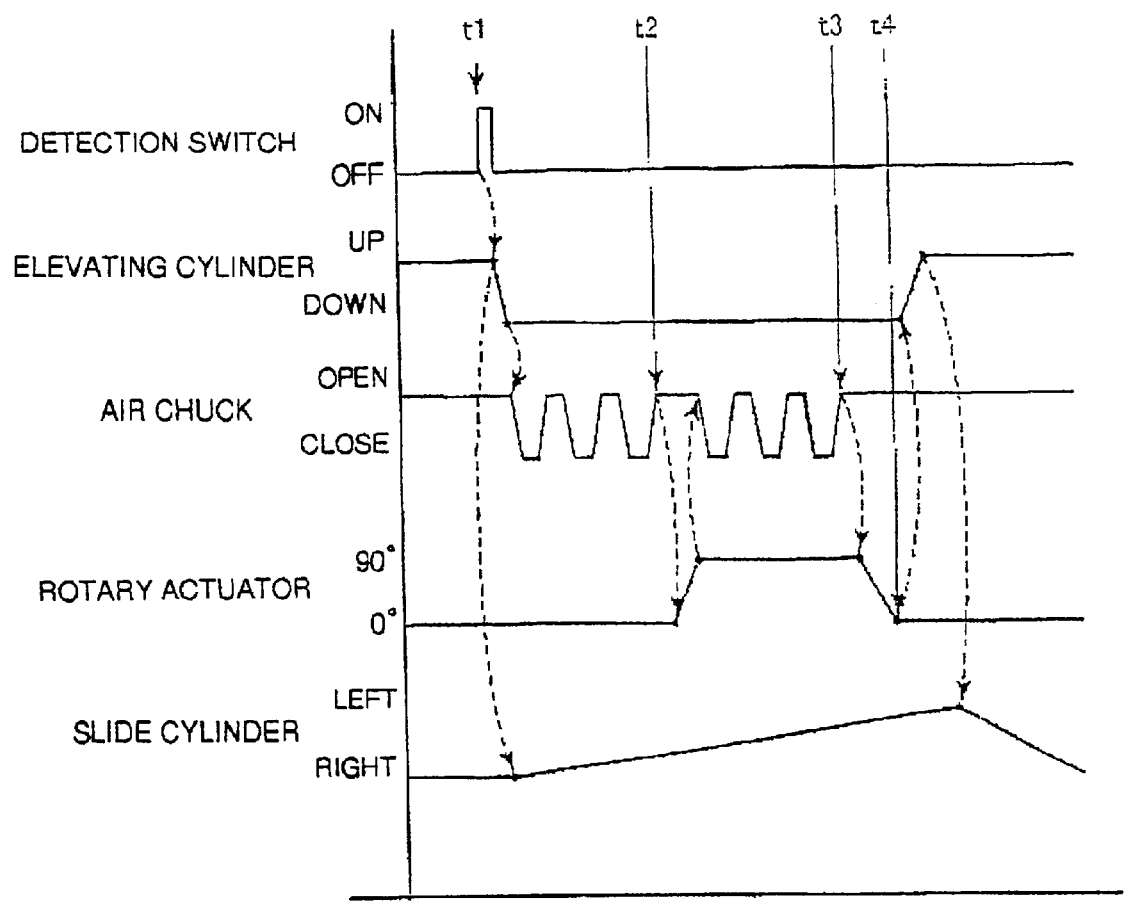
FIG. 8 is a timing chart showing the operation of the embodiment shown in FIG. 4.

FIG. 8 is a timing chart showing the operation of the waterproofing apparatus of the embodiment shown in FIG. 4.

With reference to FIGS. 4 and 8, at time t1 the detection switch SW detects the arrival of the waterproofing portion of a wire harness 4 covered with a sheet 3 at a predetermined waterproofing position during feeding of the assembling plate 15 along the conveyor line. Thereafter, under the control of the control unit 40, compressed air is supplied from the compressed air supply source 18 to the elevating cylinder 17 to move the hand unit 37 downwardly until the hands 11 of the air chuck 12 are disposed at both sides of the waterproofing portion of the wire harness 4 and the waterproofing portion is disposed at the rotational center of the introduction groove containing gear 13. Also at this time, compressed air is supplied to the slide cylinder 20 to reciprocate the rod 23 so that the hand unit 37 follows the assembling plate 15 and the waterproofing portion of the wire harness thereon, along the conveyor line.

Thereafter, under the control of the control unit 40, compressed air is supplied from the compressed air supply source 18 to the air chuck 12 in order to drive the hands 11 so that hands 11 are repeatedly opened and closed to repeatedly pat, clamp or press the wire harness 4 from both sides of the sheet 3 as shown in FIG. 7.

Thereafter, under the control of the control unit 40, at time t2 when the hands 11 are in an opened, non-clamping condition, compressed air is supplied from the compressed air supply source 18 to the rotary actuator 14 to thereby rotate the air chuck 12 by 90° through the gear mechanism. Thereafter, the waterproofing portion of the wire harness 4 is pressed or patted in a different direction by the hands 11. That is, the waterproofing portion of the wire harness 4 is repeatedly clamped and pressed vertically as shown in FIG. 7.

As described above, in the waterproofing portion which includes the sheet 3, the electric wires 5, and filler 6, the penetration of the filler 6 into the gaps thereof is accelerated by the repeated pressing or patting which displaces the sheet 3, the electric wires 5, and the filler 6 relative to each other. Thus, as shown in FIG. 7, the waterproofing apparatus of the present invention sufficiently spreads or penetrates the filler into the gaps between the sheet 3 and the electric wires 5 and the gaps between the electric wires 5 themselves.

Figure 3:
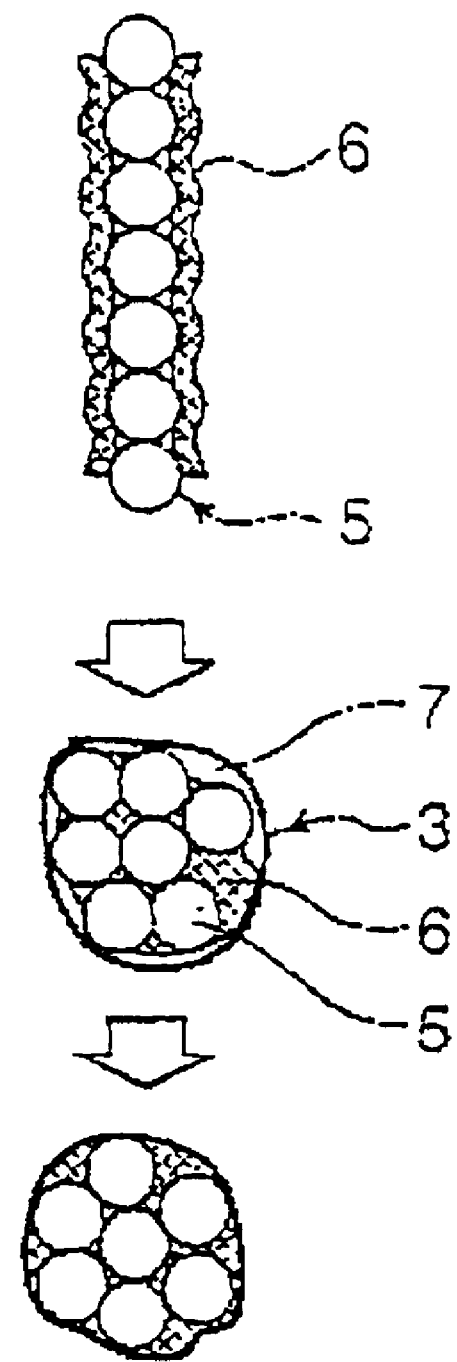
FIG. 3 is a view showing steps in the conventional method for filling a filler between electric wires.

In the conventional process as shown in FIG. 3, the filler is merely applied to the surface of the electric wires arranged in close contact with each other. However, after the electric wires are arranged in a bundle, the sheet, the electric wire, and the filler are displaced from each other during covering of the bundle with the sheet. Thus, the conventional process fails to sufficiently spread and penetrate the filler into the gaps between the sheet and the electric wires and the gaps between the electric wires.

In the present invention, while the hand unit 37 is pressing the waterproofing portion of the wire harness 4, the air chuck-supporting arm 19 is driven by the slide cylinder 20 to move the hand unit 37 at a speed equal to that of the assembling plate 15 and in the same direction as the moving direction of the assembling plate 15. Therefore, it is possible to efficiently waterproof the wire harness 4 while the assembling plate 15 moves horizontally to a subsequent station without stopping.

After the hands 11 repeat the opening and closing operation in order to press the waterproofing portion both horizontally and vertically, the rotary actuator 14 is driven at time t3, while the hands 11 are in an opened condition, to reciprocate the air chuck 12. After the reciprocating operation terminates at time t4, the elevating cylinder 17 moves the hand unit 37 upward, and the slide cylinder 20 returns the air chuck-supporting arm 19 and the hand unit 37 to their initial positions.

After the hand unit 37 returns to its initial position, the hand unit 37 waits at the initial position until the waterproofing portion of a subsequent wire harness 4 fixed to the subsequent assembling plate 15 moves into the predetermined waterproofing position.

In a series of operations of the waterproofing apparatus 10, the filler filled in the waterproofing portion of successive the wire harnesses can penetrate into the gaps between the sheet 3 and the electric wires 5 and between the electric wires 5 themselves. Thus, it is possible to waterproof a large number of the wire harnesses 4 successively.

The speed and pressure at which the hands 11 open and close to pressure the waterproofing portion of the wire harness 4 are controlled by the amount and pressure of the compressed air supplied to the air chuck 12 which operates the hands 11 and may be varied. The number of times which the waterproofing portion of the wire harness 4 is pressed by the hands 11 is controlled by the number of times the compressed air is fed to the air chuck 12 and may be varied. The rotational angle of the hand 11 can be set to any desired angle less than 360° by controlling the compressed air supplied to the rotary actuator 14 to rotate the introduction groove-formed gear 13.

In the embodiment described above, an in-line method is envisioned. That is, waterproofing operations are performed on the conveyor line for assembling the wire harness. The waterproofing may also be done by an off-line method. That is, the waterproofing operations may be performed at a station apart from the conveyor line. The fixing tool 16 does not necessarily have to be provided. The rotational angle of the introduction groove containing gear 13 does not necessarily have to be 90°, but rather any desired angle less than 360° can be selected.

It is preferable to automate the method of pressing the sheet, the electric wires 5, and the filler 6 of the waterproofing portion by using the air chuck 12, the elevating cylinder 17, and the rotary actuator 14. It is thereby possible to control the speed, the pressure, and number of pressing operations, as well as the pressing angle. However, all of these processes do not necessarily have to be automated. For example, the wire harness may be pressed manually. The entire process may be performed manually, or may be a combination of automated and manual operations.

In the embodiment described above, in the waterproofing portion including the sheet, the electric wires, and the filler, the penetration of the filler throughout the waterproofing portion does not depend only on the flowability thereof and gravity, but is accelerated by displacing the sheet, the electric wires, and the filler relative to each other. Thus, the waterproofing apparatus of the embodiment has the effect of sufficiently spreading and penetrating the filler into the gaps between the sheet and the electric wires and the gaps between the electric wires themselves.

After the bundle of the electric wires are arranged to make the bundle thereof sectionally circular, the bundle is enclosed by the sheet. Thereafter, the sheet, the electric wire, and the filler are displaced relative to each other by pressing. Thus, the waterproofing apparatus of the present invention has the effect of sufficiently spreading and penetrating the filler filled in the waterproofing portion and enclosed with the sheet into the gaps between the sheet and the electric wires and the gaps between the electric wires themselves.

Since the filler sufficiently penetrates into the gaps between the sheet and the electric wires and the gaps between the electric wires themselves, it is possible to produce a wire harness having reliable waterproof performance even if the filler has a high viscosity.

Although the invention has been described with reference to an exemplary embodiment, it is understood that the words that have been used are words of description and illustration, rather than words of limitation. Changes may be made, within the purview of the appended claims, as presently stated and as amended, without departing from the scope and spirit of the present invention in its aspects. Although the invention has been described herein with reference to particular means, materials and embodiments, the invention is not intended to be limited to the particulars disclosed herein. Instead, the invention extends to all functionally equivalent structures, methods and uses, such as are within the scope of the appended claims.

The present disclosure relates to subject matter contained in priority Japanese Application No. 2001-001717, filed on Jan. 9, 2001, the disclosure of which is herein expressly incorporated by reference in its entirety.

What is claimed is:

1. An apparatus for waterproofing a wire harness comprising:
a clamping mechanism configured to clamp a waterproofing portion of a bundle of electric wires of a wire harness so that the bundle is pressed in a radial direction thereof, the waterproofing portion including a sheet wound around the bundle of electric wires and a filler for sealing gaps between the electric wires and the sheet;
a rotation mechanism configured to rotate said clamping mechanism about an axis of the waterproofing portion; and
a controller that controls operation of said clamping mechanism and said rotation mechanism so that at predetermined time intervals, said rotation mechanism alters a pressing position of the waterproofing portion by rotating said clamping mechanism relative to the waterproofing portion.

2. The apparatus for waterproofing a wire harness according to claim 1, wherein said clamping mechanism is substantially U-shaped and includes opposing arms configured to receive the waterproofing portion therebetween.

3. The apparatus for waterproofing a wire harness according to claim 1, wherein said clamping mechanism repeatedly pats the waterproofing portion.

4. The apparatus for waterproofing a wire harness according to claim 1, wherein said rotation mechanism includes an introduction groove containing gear connected with said clamping mechanism for rotation therewith, and having an introduction groove configured to receive the waterproofing portion therein, and a driving mechanism including an output gear configured to engage and drive said introduction groove containing gear to rotate said clamping mechanism about the axis of the waterproofing portion.

5. The apparatus for waterproofing a wire harness according to claim 1, wherein the wire harness is continuously fed along a feed path in a downstream direction at a predetermined speed, said apparatus further comprising a movement mechanism configured to move said clamping mechanism in the downstream direction at the predetermined speed during clamping of the waterproofing portion.

6. The apparatus for waterproofing a wire harness according to claim 5, further comprising a detector that detects a position of the wire harness along the feed path.

7. The apparatus for waterproofing a wire harness according to claim 6, wherein said detector detects a leading edge of an assembly board on which the wire harness is fed along the feed path.

8. An apparatus for waterproofing a wire harness comprising:
a clamping mechanism configured to clamp a waterproofing portion of a bundle of electric wires of a wire harness so that the bundle is pressed in a first radial direction thereof, the waterproofing portion including a sheet wound around the bundle of electric wires and a filler for sealing gaps between the electric wires and the sheet; and
a rotation mechanism configured to rotate said clamping mechanism about an axis of the waterproofing portion so that said clamping mechanism presses the bundle in a second radial direction thereof.

9. The apparatus for waterproofing a wire harness according to claim 8, wherein said clamping mechanism is substantially U-shaped and includes opposing arms configured to receive the waterproofing portion therebetween.

10. The apparatus for waterproofing a wire harness according to claim 8, wherein said clamping mechanism repeatedly pats the waterproofing portion.

11. The apparatus for waterproofing a wire harness according to claim 8, wherein said rotation mechanism includes an introduction groove containing gear connected with said clamping mechanism for rotation therewith, and having an introduction groove configured to receive the waterproofing portion therein, and a driving mechanism including an output gear configured to engage and drive said introduction groove containing gear to rotate said clamping mechanism about the axis of the waterproofing portion.

12. The apparatus for waterproofing a wire harness according to claim 8, wherein the wire harness is continuously fed along a feed path in a downstream direction at a predetermined speed, said apparatus further comprising a movement mechanism configured to move said clamping mechanism in the downstream direction at the predetermined speed during clamping of the waterproofing portion.

13. The apparatus for waterproofing a wire harness according to claim 12, further comprising a detector that detects a position of the wire harness along the feed path.

14. The apparatus for waterproofing a wire harness according to claim 13, wherein said detector detects a leading edge of an assembly board on which the wire harness is fed along the feed path.

* * * * *